United States Patent [19]

Morley, Jr. et al.

[11] 4,252,150

[45] Feb. 24, 1981

[54] PNEUMATIC FAUCET ATTACHMENT

[76] Inventors: Harold T. Morley, Jr., 2618 E. 37th St., Tulsa, Okla. 74105; John Duchan, 10642 E. 34th St., Tulsa, Okla. 74145

[21] Appl. No.: 20,831

[22] Filed: Mar. 16, 1979

[51] Int. Cl.³ .................................. F16L 37/06
[52] U.S. Cl. ................................. 137/798; 285/8; 285/97
[58] Field of Search ............... 137/798; 285/8, 97, 285/346

[56] References Cited

U.S. PATENT DOCUMENTS

| 2,152,429 | 3/1939 | Cave | 285/8 |
| 3,075,535 | 1/1963 | Lasting | 285/97 X |
| 3,190,679 | 6/1965 | Lester | 285/8 |
| 3,222,076 | 12/1965 | Hollingsworth | 285/97 X |
| 3,707,301 | 12/1972 | Rauls | 285/8 X |

Primary Examiner—Gerald A. Michalsky
Attorney, Agent, or Firm—Head & Johnson

[57] ABSTRACT

A quick connect-disconnect attachment for faucets for delivery of liquid therefrom through an extension hose. The attachment is retained by pneumatic pressure created by a hand-operated bulb. A valve permits release of the pressure therein for removal of the attachment.

5 Claims, 4 Drawing Figures

PNEUMATIC FAUCET ATTACHMENT

BACKGROUND OF THE INVENTION

The invention is directed to the field of quick connect-disconnect faucet attachment devices.

There are many appliances, domestic in-the-home or outdoor devices, which require liquid flow at remote locations away from the normal flow line or outlet faucet nozzle, yet need to be readily disconnected for normal use of the faucet or use of the attachment and extension elsewhere. Typically, such devices heretofore known in the prior art are mechanically, i.e. threaded, flanged, or otherwise friction connected to the liquid outlet. Devices for in-the-home use, however, must be capable of quick connect-disconnect and without marring the beauty of the fixture.

SUMMARY OF THE INVENTION

In its broadest aspects the invention is directed to an attachment which may be quickly connected and disconnected to a faucet nozzle by the utilization of pneumatic pressure. The attachment may include means, such as an extension hose or line for carrying liquid to places and needs beyond the normal faucet outlet. For instance, the attachment of this invention includes use with dental hygiene equipment, such as is sold under the trademark "WATER-PIK", or use with other types of personal hygiene tools or implements which require hydraulic pressure, or use of water at remote locations from the normal outlet faucet.

Further object of the invention is to provide an apparatus, including an axial conduit for the flow of liquid therethrough from an inlet end to an outlet end. Spaced cylindrical support disks of larger diameter than conduit are attached adjacent the inlet and outlet ends. A flexible bulb is sealably positioned between the disks to define an air pressure chamber. A flexible bellows having a cylindrical female portion to receive the faucet nozzle includes an annular expansion chamber. Appropriate conduits are provided within the disk such that, upon hand squeezing the bulb, air pressure is allowed to enter the expansion chamber and be trapped therein to expand the bellows inwardly to grip the faucet nozzle without water leakage until release of the pressure through an appropriate conduit and valve means. An additional valve is provided to permit inlet of air into the bulb upon its release and to close upon the bulb being squeezed. Appropriate connectors are provided for extension lines or conduits from the outlet to carry the liquid from the faucet to the desired need or use.

A yet further aspect of the invention is to provide means within the axial conduit to cause the pulsating or vibrating liquid flow in the outlet.

DETAILED DESCRIPTION OF THE PREFERRED EMBODIMENT

Before explaining the present invention in detail, it is to be understood that the invention is not to be limited in its application to the details of construction and arrangement of parts illustrated in the accompanying drawings, since the invention is capable of other embodiments and of being practiced or carried out in a variety of ways. Also, it is to be understood that the phraseology or terminology employed herein is for the purpose of description and not of limitation.

Figure 1:
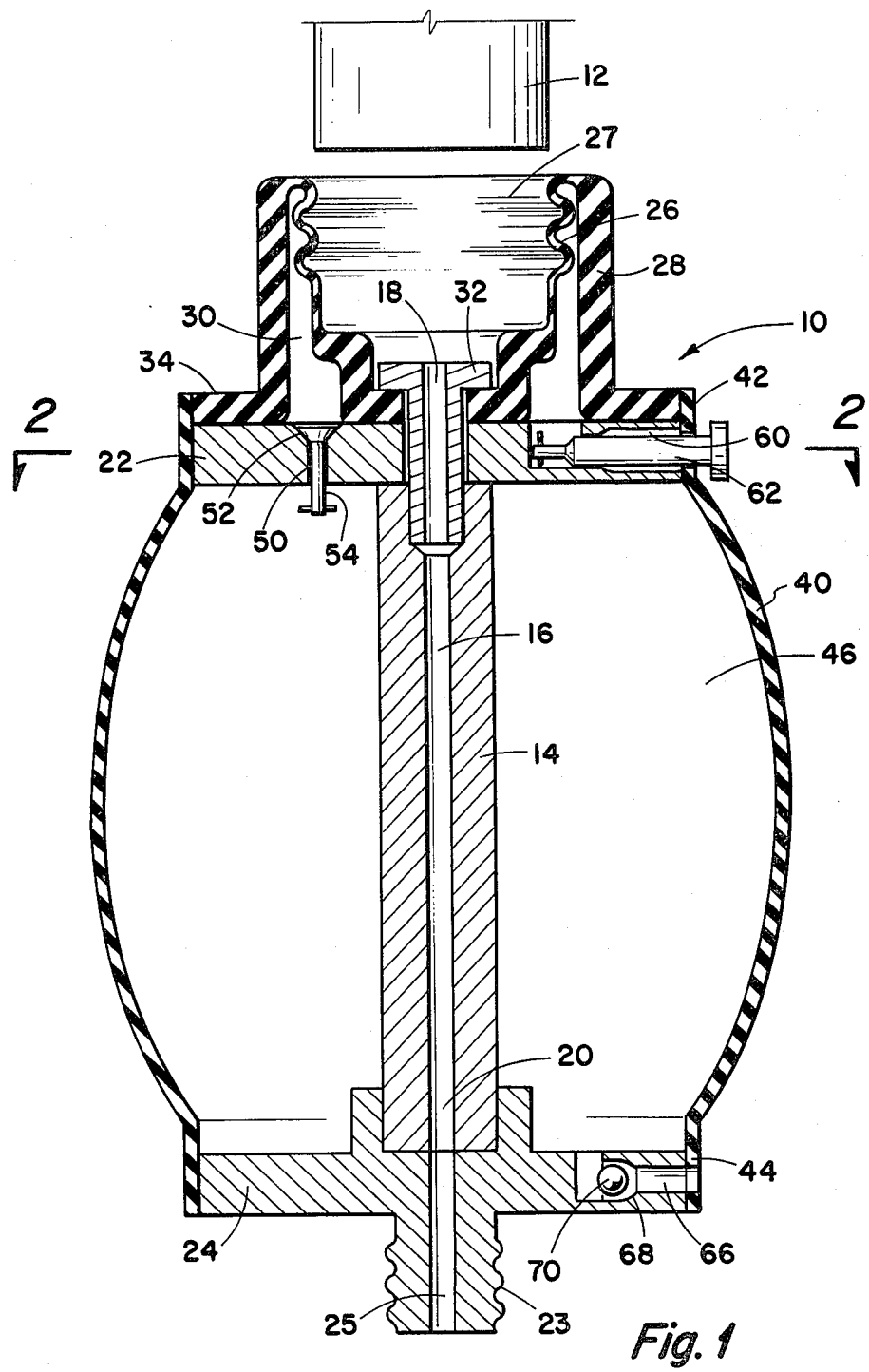
FIG. 1 is a sectional view of the attachment apparatus of this invention.
Figure 2:
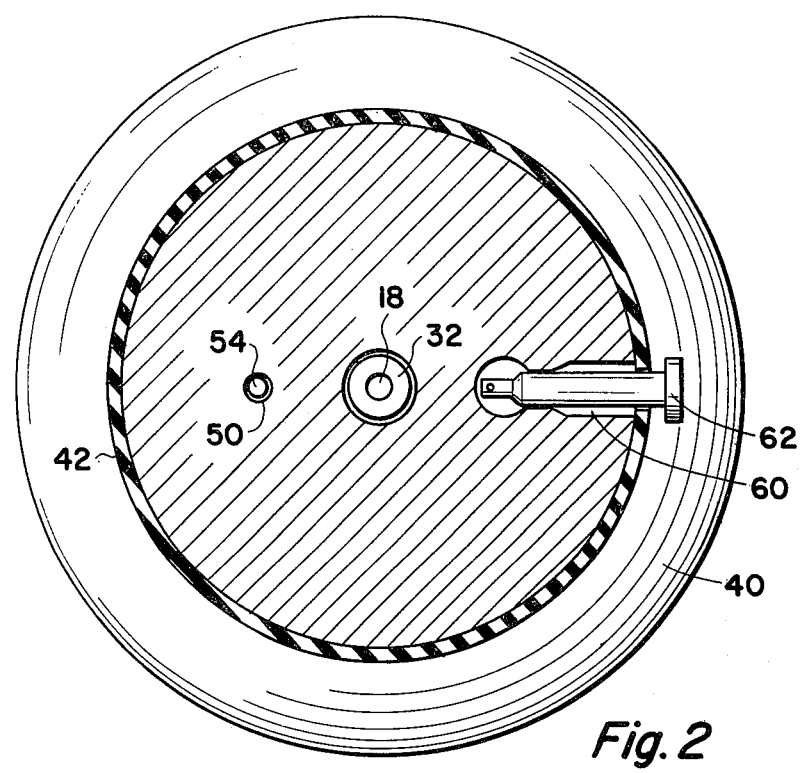
FIG. 2 is a sectional view taken along 2—2 of FIG. 1.

Referring now to FIGS. 1 and 2, the faucet attachment device of the invention is generally designated by the numeral 10. The device is adapted to be attached to typical faucet nozzle 12. The attachment basically comprises an axial member 14 through which an axial conduit 16 is provided for flow of liquid from the nozzle 12 through inlet end 18 and an outlet end 20. A first cylindrical disk 22 is attached to the member 14 adjacent the inlet end. Spaced therefrom is a second cylindrical disk 24 likewise attached to the member 14 adjacent the outlet end. Attached to the inlet side of the disk 22 is a flexible bellows 26 defining a female portion 27 to receive the faucet nozzle 12. The bellows includes a relative rigid outer wall 28 defining, between the flexible bellows and the wall, an annular expansion chamber 30. In the embodiment shown a retention sleeve 32 is positioned to seal the bellows assembly to member 14 and disk 22. The outer wall 28 includes outward lip 34, which is sealably attached to the inlet side of disk 22.

A flexible rubber bulb 40 is attached to the periphery of first disk at 42 and to the second disk at 44 creating an annular air pressure chamber 46 about member 14.

A first conduit 50 provides communication between the annular expansion chamber 30 and the air pressure chamber 46. The conduit includes a valve seat 52 upon which check valve 54 is operable. In this embodiment a second conduit 60 is provided in the first disk 22, which includes an appropriate manually-operated valve 62 for relieving the pressure within the expansion chamber 30 to the atmosphere and thus retract the bellows 26 from sealed contact with nozzle 12.

A third conduit 66, in this embodiment, is shown located in the second disk. This conduit includes a valve seat 68 to which a ball check valve 70 will operate. The second disk 24 includes outlet 25 which communicates with the axial member 14 and flow outlet 20. Exterior connection means are provided for attachment to a flexible line or other devices as needed.

It is to be understood that the third conduit can be a part of the first disk 22.

Figure 3:
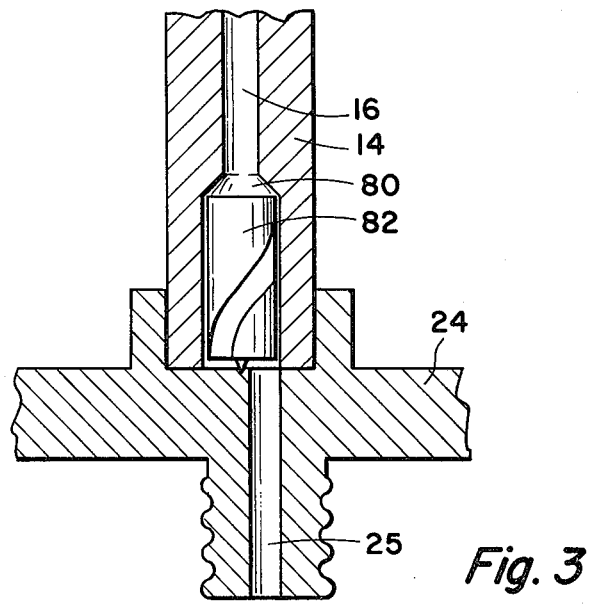
FIG. 3 is a partial sectional view of a modified apparatus depicting means for creating a pulsating flow of liquids in the outlet.

Referring now to FIG. 3, an alternate embodiment of this invention is shown in which the lower end of the axial member 14 includes an enlarged opening 80 into which, prior to assembly, an impeller 82 is rotatably positioned. The impeller includes a helical shape such that the pressure of the liquid via conduit 16 will rotate the impeller. The impeller is located relative to the outlet 25, which in this embodiment is off-set from the longitudinal axis of the attachment such that during rotation of the helical impeller 82 the flow of liquid is alternately interrupted to provide a pulsating or vibrating flow.

Figure 4:
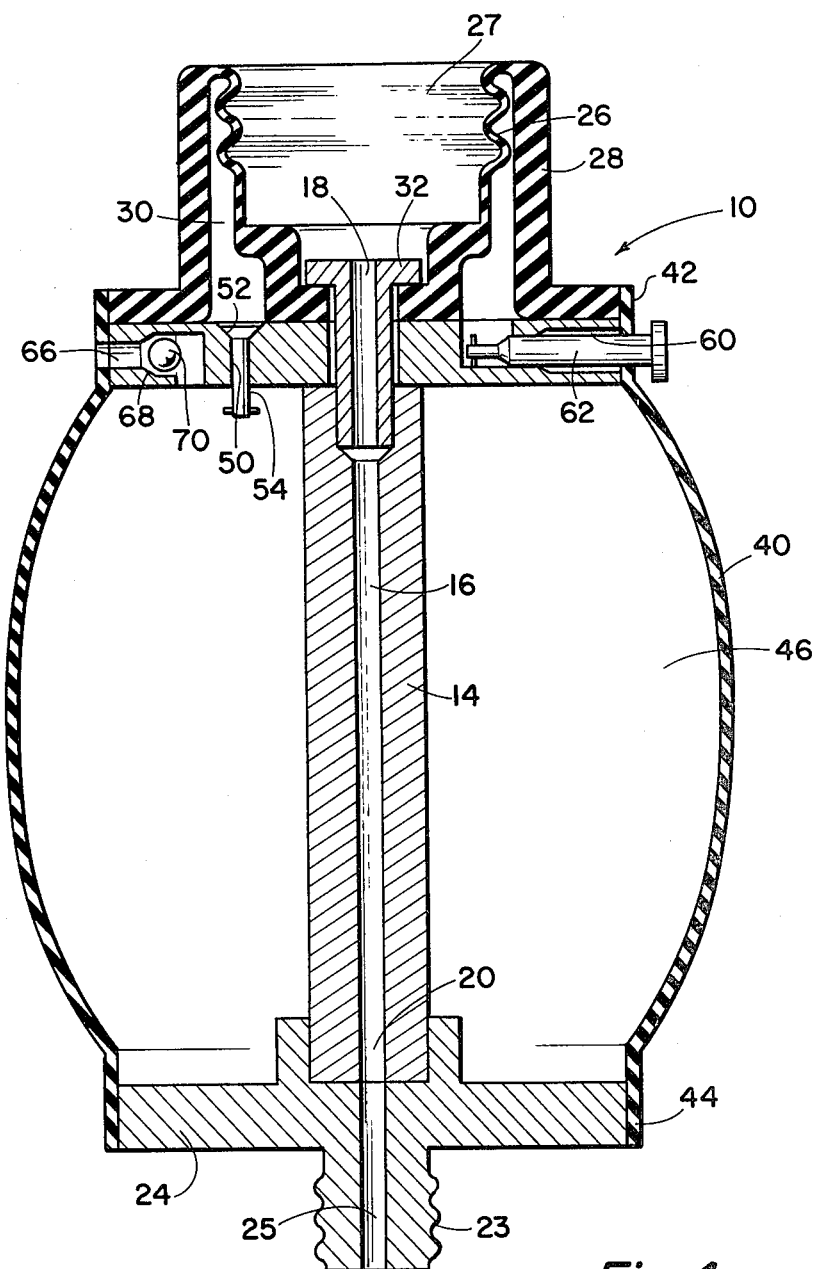
FIG. 4 is a sectional view of an additional embodiment.

FIG. 4 describes an alternate embodiment wherein the third conduit 66 and its associated valve seat 68 and ball check 70 are manufactured as a part of the first disk, whereas the second disk would be solid.

OPERATION

When it is desired that the faucet attachment be connected to faucet 12 the female portion of the bellows is inserted over the faucet end. Thereafter, the bulb 40 is squeezed, creating pressurized air within the air pressure chamber 46 sufficient to open check valve 54 and admit the pressurized air into the expansion chamber 30. This causes the bellows 26 to move radially inward into sealed engagement with the end of the faucet 12. Simultaneous with the squeezing of the bulb 40 check valve 70 seats upon valve seat 68 closing the conduit 66 and trapping the air therein. Upon release of the bulb the ball check 70 releases from the seat and allows atmospheric air to enter via conduit 66 into the pressure chamber 46 for additional pressurization as needed.

Liquid is then supplied by operation of valving associated with the nozzle into the attachment flowing through conduit 16 to the outlet for the intended use.

When it is desired to release the attachment, valve 62 is moved to a position opening the second conduit 60 and thus relieve the pressure within the expansion chamber 30 to the atmosphere. The attachment is removed, valve 62 closed, resetting the attachment for future use.

What is claimed:

1. Apparatus for attachment to a liquid supply faucet nozzle comprising in combination:
   an axial conduit for liquid to pass having an inlet end and an outlet end,
   a first cylindrical support disk of larger diameter than the conduit and attached thereto adjacent the inlet and,
   flexible bellow means sealably attached to the inlet side of the first disk, said bellows having a cylindrical female portion to receive the faucet nozzle, said bellows defining an annular expansion chamber,
   a second cylindrical support disk of larger diameter than the conduit and attached thereto adjacent the outlet end,
   a flexible squeezable cylindrical bulb sealably attached between the first and second disk to define an air pressure chamber,
   a first conduit in the first disk, and a check valve therein operable to provide communication between the air pressure chamber and the expansion chamber when the bulb is squeezed and close the conduit when the bulb is released,
   a second valve conduit in the first disk, providing selective communication between the expansion chamber and the atmosphere surrounding the attachment,
   a manual valve in the second conduit operable therein to provide, in one position, communication of the expansion chamber and the atmosphere, and closing the second conduit in the other position,
   a third valve conduit extending between the air pressure chamber and the atmosphere,
   a check valve in the third conduit operable in one position to close the third conduit when the bulb is squeezed and to open the third conduit when the bulb is released, and
   means to connect at the outlet end an extension line for the liquid flow.

2. Apparatus of claim 1 wherein the third conduit and check valve is located in the first disk.

3. Apparatus of claim 1 wherein the third conduit and check valve is located in the second disk.

4. Apparatus of claim 1 wherein the axial conduit includes means to alternately interrupt the flow therethrough to impart a pulsating liquid flow to the outlet.

5. Apparatus of claim 4 wherein the means to alternately interrupt the flow comprises a helical rotatable vane which alternately opens and closes the axial conduit when liquid under pressure is applied thereto.

* * * * *